(12) United States Patent
Fujita (10) Patent No.: US 7,357,232 B2
(45) Date of Patent: Apr. 15, 2008

(54) FRONT FORK IN TWO-WHEELED MOTOR VEHICLE OR THE LIKE

(75) Inventor: Nobuaki Fujita, Shizuoka (JP)

(73) Assignee: Showa Corporation, Saitama (JP)

( * ) Notice: Subject to any disclaimer, the term of this patent is extended or adjusted under 35 U.S.C. 154(b) by 284 days.

(21) Appl. No.: 11/158,173

(22) Filed: Jun. 21, 2005

(65) Prior Publication Data

US 2006/0137947 A1 Jun. 29, 2006

(30) Foreign Application Priority Data

Dec. 24, 2004 (JP) ............................. 2004-374986

(51) Int. Cl.
| | |
|---|---|
| *F16F 9/00* | (2006.01) |
| *F16F 9/34* | (2006.01) |
| *F16F 7/00* | (2006.01) |
| *F16F 11/00* | (2006.01) |
| *B60G 13/00* | (2006.01) |
| *B60G 15/00* | (2006.01) |
| *B62K 1/00* | (2006.01) |
| *B62K 17/00* | (2006.01) |
| *B62K 21/00* | (2006.01) |
| *B62M 3/00* | (2006.01) |

(52) U.S. Cl. ...................... 188/297; 188/315; 188/316; 188/322.13; 280/276; 267/226

(58) Field of Classification Search ................ 188/297, 188/282.5, 315, 316, 322.18, 322.17, 282.1, 188/275, 276, 221.1, 226, 34, 313, 314, 195, 188/64.11, 64.15, 64.26; 267/221, 225, 226; 280/276, 279, 124.154, 124.161
See application file for complete search history.

(56) References Cited

U.S. PATENT DOCUMENTS

| 4,561,669 | A | * | 12/1985 | Simons ....................... 280/276 |
| 5,456,480 | A | * | 10/1995 | Turner et al. ................ 280/276 |
| 6,120,049 | A | * | 9/2000 | Gonzalez et al. ........... 280/276 |
| 6,135,477 | A | * | 10/2000 | D'Aluisio et al. .......... 280/276 |
| 6,217,049 | B1 | * | 4/2001 | Becker ........................ 280/276 |
| 6,244,398 | B1 | * | 6/2001 | Girvin et al. ................ 188/316 |
| 6,244,609 | B1 | * | 6/2001 | Wilson ........................ 280/276 |
| 6,253,888 | B1 | * | 7/2001 | Bell et al. .................... 188/275 |

(Continued)

FOREIGN PATENT DOCUMENTS

JP HEI 8-270705 10/1996

*Primary Examiner*—Bradley King
*Assistant Examiner*—Thomas W Irvin
(74) *Attorney, Agent, or Firm*—Orum & Roth, LLC (57) ABSTRACT

In an inverted type front fork in a two-wheeled motor vehicle or the like, a stopper plate having a through hole formed in a center portion is fitted to an inner periphery of an upper end portion of an inner tube. A rod attached to an outer tube is inserted into the inner tube via the through hole of the stopper plate. A spring seat supporting an upper end portion of a suspension spring is provided in a end portion of the rod. A rebound spring is interposed between the spring seat and the stopper plate. A plurality of connecting holes connecting upper and lower air chambers locating above and below the stopper plate are formed in an outer peripheral portion of the stopper plate, and a flow path connecting the upper and lower air chambers locating above and below the stopper plate is formed within the rod.

5 Claims, 7 Drawing Sheets

U.S. PATENT DOCUMENTS

| | | | |
|---|---|---|---|
| 6,260,832 B1 * | 7/2001 | Vignocchi et al. | 267/64.15 |
| 6,328,291 B1 * | 12/2001 | Marzocchi et al. | 267/64.15 |
| 6,343,807 B1 * | 2/2002 | Rathbun | 280/276 |
| 6,505,719 B2 * | 1/2003 | Gonzalez et al. | 188/319.2 |
| 6,520,524 B1 * | 2/2003 | Costa | 280/276 |
| 6,592,136 B2 * | 7/2003 | Becker et al. | 280/276 |
| 7,083,028 B2 * | 8/2006 | Fujita et al. | 188/321.11 |
| 2001/0042663 A1 * | 11/2001 | Marking et al. | 188/266 |
| 2003/0001358 A1 * | 1/2003 | Becker et al. | 280/276 |
| 2003/0173170 A1 * | 9/2003 | Nagai | 188/316 |
| 2003/0213664 A1 * | 11/2003 | Beck | 188/289 |
| 2004/0020730 A1 * | 2/2004 | Turner | 188/322.13 |
| 2005/0073128 A1 * | 4/2005 | Wada et al. | 280/279 |
| 2005/0121274 A1 * | 6/2005 | Fujita et al. | 188/322.19 |
| 2005/0133320 A1 * | 6/2005 | Fujita et al. | 188/297 |
| 2005/0145456 A1 * | 7/2005 | Tomonaga et al. | 188/297 |

* cited by examiner

FRONT FORK IN TWO-WHEELED MOTOR VEHICLE OR THE LIKE

BACKGROUND OF THE INVENTION

1. Field of the Invention

The present invention relates to a structure of a front fork which can effectively accommodate an oil filling operation for a front fork.

2. Description of the Related Art

In Japanese Patent Application Laid-open No. 8-270705 (patent document 1), there is disclosed an inverted type front fork apparatus which is constituted by a left tube assembly 1 and a right tube assembly 2, and which has a damper apparatus 14 built-in only in the left tube assembly 1. The right tube assembly 2 having no damper apparatus 14 built-in is structured, as shown in FIG. 2 thereof, such that a lower end portion of a suspension spring 13 is supported to an axle bracket 15, and an upper end portion is supported to a suspension piece 62 fixed to a support rod 61 via a washer 59 and a suspension collar 60. An upper end of the support rod 61 is screwed to a fork bolt 23.

A rebound stopper 64 is screwed to an upper end of the inner tube 12. The rebound stopper 64 is brought into contact with a bound stopper 63 at a time of maximum compression, whereby a compression stroke of the right tube assembly 2 is stopped. The rebound spring 65 is attached to the suspension piece 62. The rebound stopper 64 is brought into contact with the rebound spring 65 at a time of maximum expansion, whereby an expansion stroke is stopped.

Figure 6:
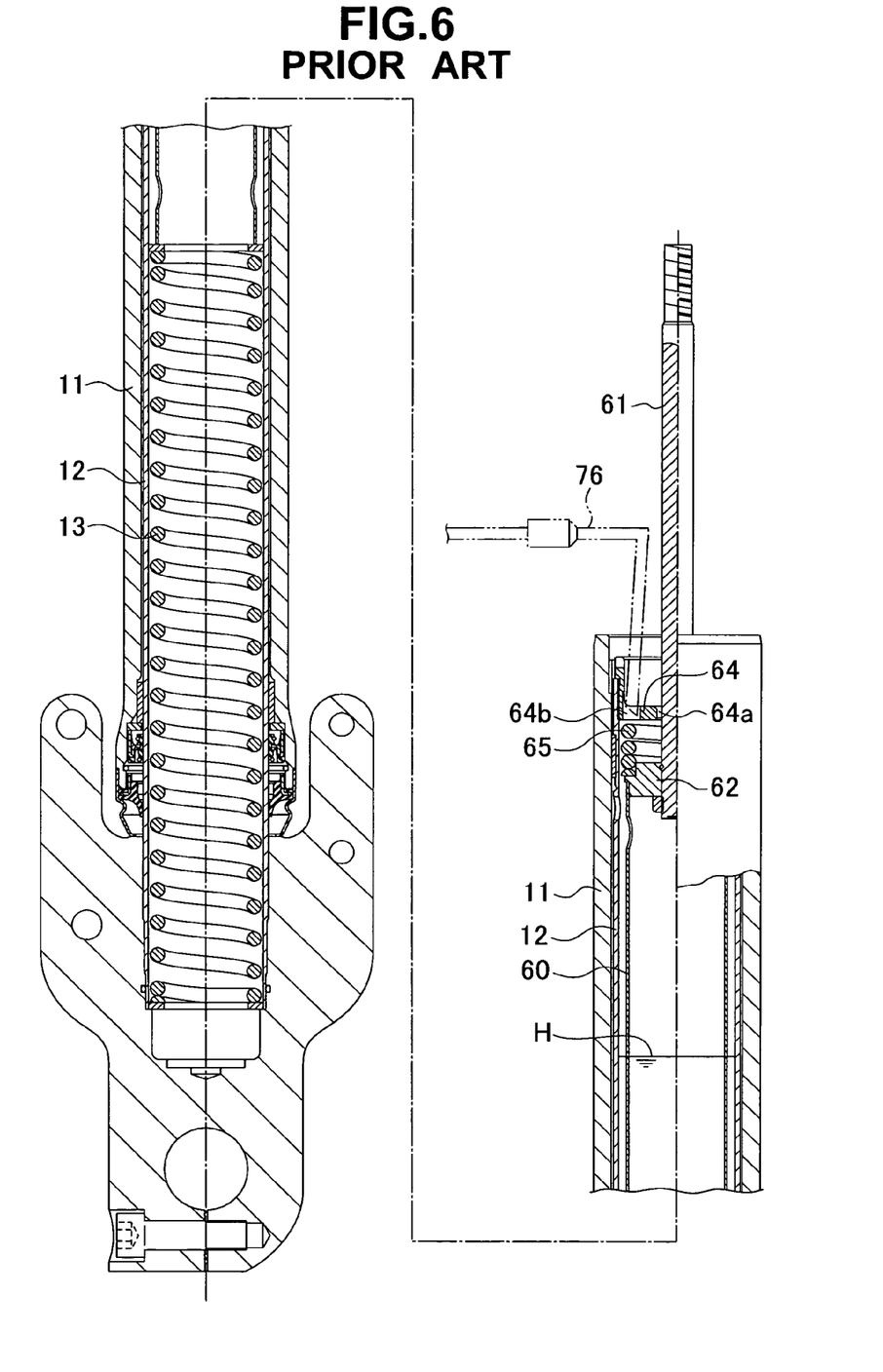
FIG. 6 is a schematic view showing an oil filling procedure for a front fork of a conventional structure.
Figure 7:
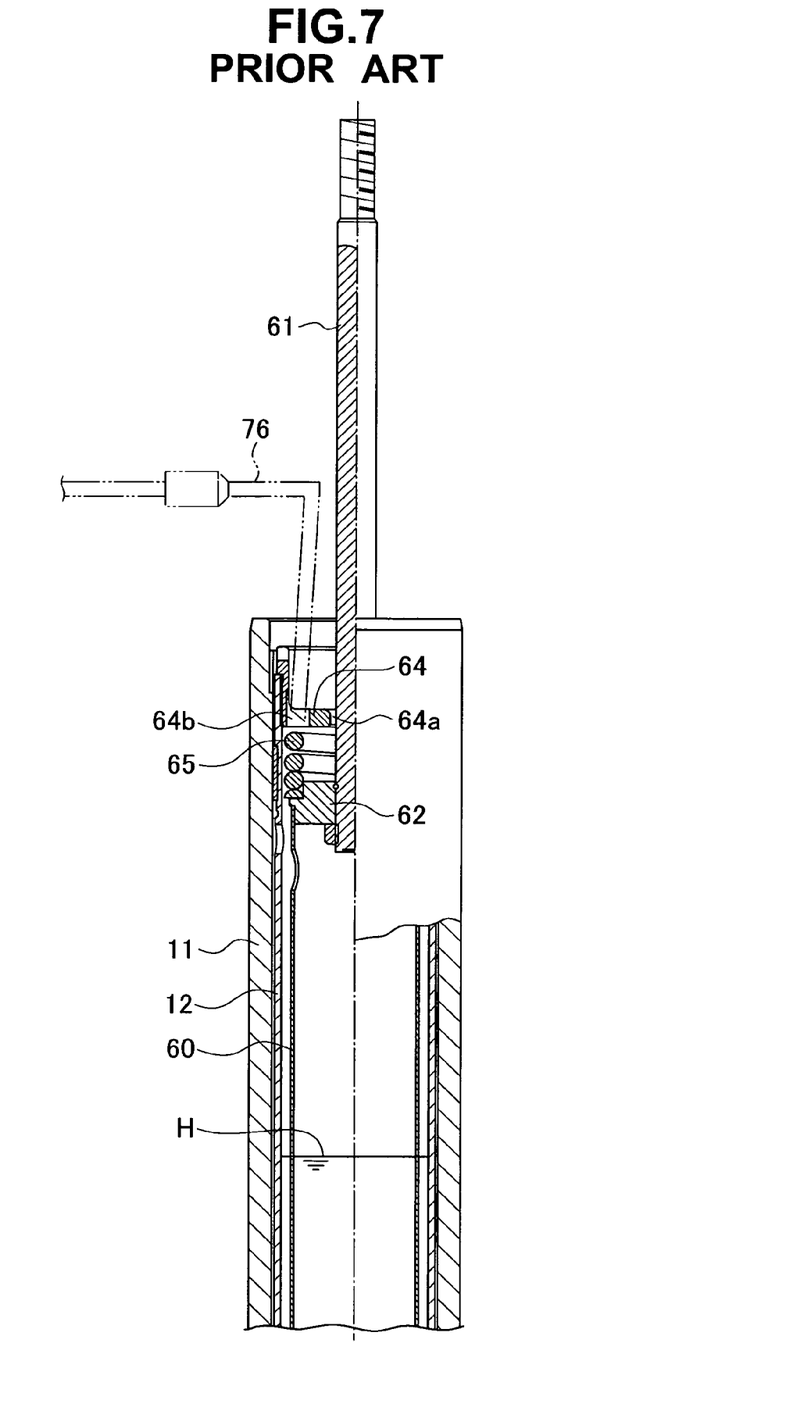
FIG. 7 is a schematic view showing an upper portion of FIG. 6 in an enlarged manner.

Not being disclosed in patent document 1 mentioned above, four connecting holes 64b are formed in an outer periphery of a center hole 64a through which the support rod 61 is inserted, formed in the rebound stopper 64. An annular gap is formed between an outer periphery of the support rod 61 and an inner periphery of the center hole 64a of the rebound stopper 64, as shown in FIGS. 6 and 7 of the present application.

An oil filling procedure during assembly of the right front fork is executed such that the outer tube 11 is pressed down to the lowest end portion of the inner tube 12, the suspension spring 13 is fully expanded, and the rebound spring 65 is compressed between the suspension piece 62 and the rebound stopper 64. At this time, since some of four connecting holes 64b formed in the rebound stopper 64 are closed by a flat end coil portion on an end portion of the rebound spring 65, the oil filling work is carried out by inserting an oil filling nozzle 76 to one of the connecting holes 64b which are not closed by the end coil portion.

However, since some of the connecting holes 64b except the connecting hole to which the oil filling nozzle 76 is inserted are closed by the end coil portion, air within a lower chamber of the rebound stopper 64 is not easily released into the atmospheric air during the oil filling, i.e., air bleeding in the lower chamber can not be achieved. Accordingly, troubles such as excessive time is required for the oil filling, cleaning being required in the later step due to an overflow of the oil, and the like are created.

SUMMARY OF THE INVENTION

An object of the present invention is to provide a front fork in a two-wheeled motor vehicle or the like provided with a structure which can facilitate rapid oil filling procedures in a front fork.

The present invention relates to an inverted type front fork in a two-wheeled motor vehicle or the like. An outer tube is provided in a vehicle body side. An inner tube in a tire wheel side is slidably insertable into the outer tube. A suspension spring is provided between the outer tube and the inner tube. An oil chamber is provided within the outer tube and the inner tube, and an air chamber is provided in an upper portion of the oil chamber. A stopper plate having a through hole formed in a center portion is fitted to an inner periphery of an upper end portion of the inner tube. The air chamber is sectioned into upper and lower sides of the stopper plate. A rod attached to the outer tube is inserted into the inner tube via the through hole of the stopper plate. A spring seat supporting an upper end portion of the suspension spring is provided in an end portion of the rod. A rebound spring is interposed between the spring seat and the stopper plate. A plurality of connecting holes connecting the upper and lower air chambers locating above and below the stopper plate are formed in an outer peripheral portion of the stopper plate, and a flow path connecting the upper and lower air chambers is formed within the rod.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
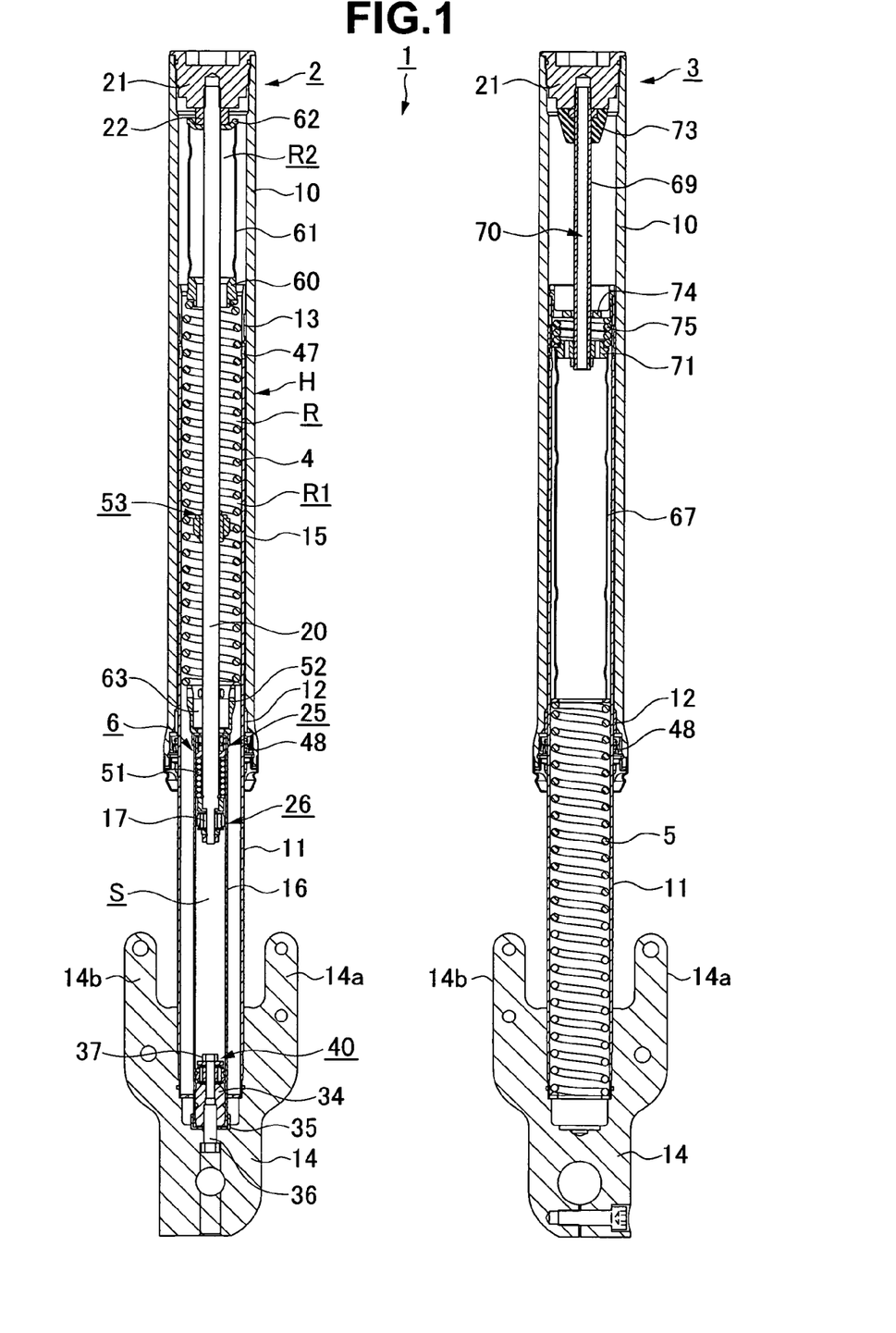
FIG. 1 is a vertical cross sectional view showing an inverted type front fork apparatus in a two-wheeled motor vehicle to which an embodiment of a front fork in accordance with the present invention is applied.
Figure 2:
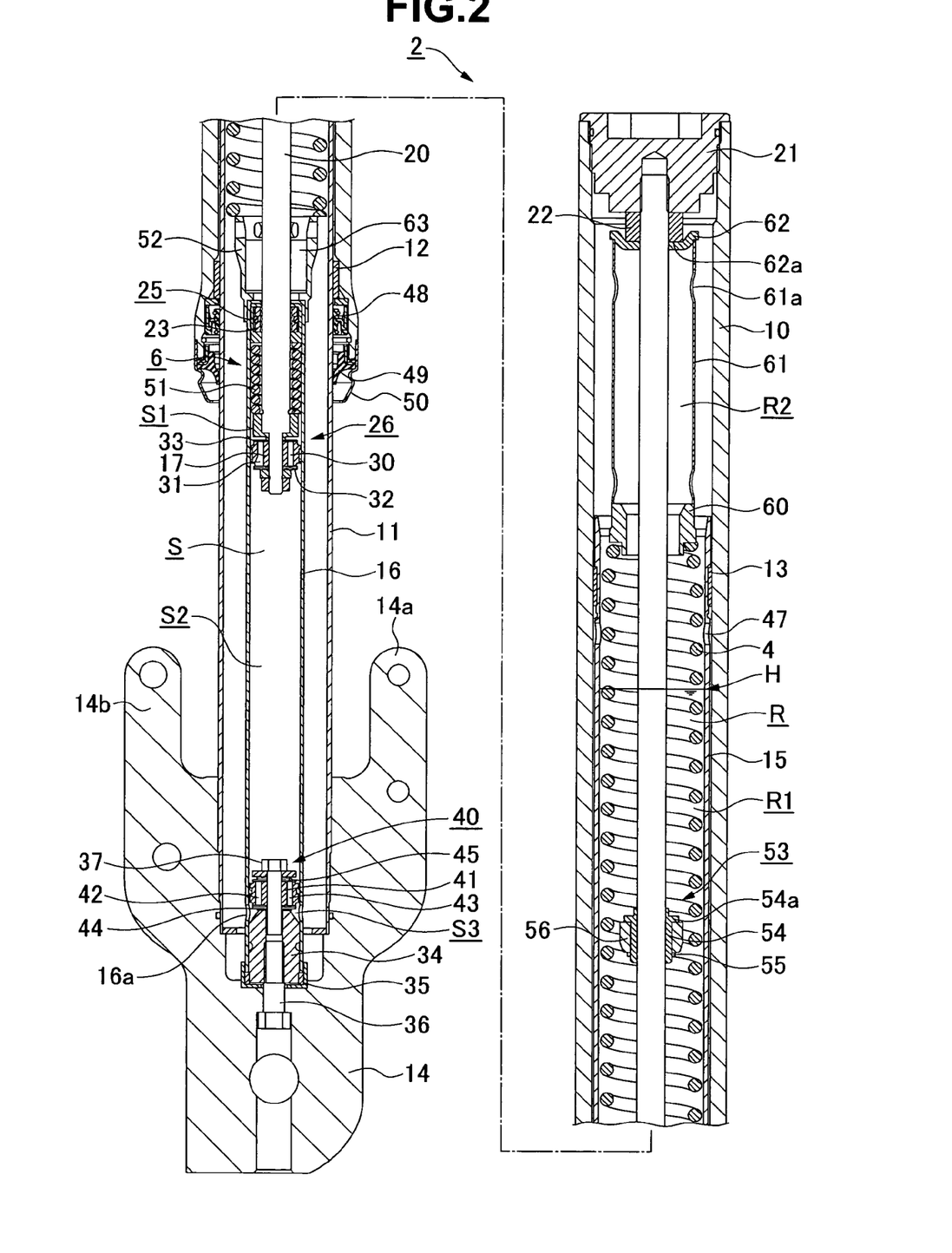
FIG. 2 is a vertical cross sectional view showing a left front fork in the inverted type front fork apparatus in FIG. 1.
Figure 3:
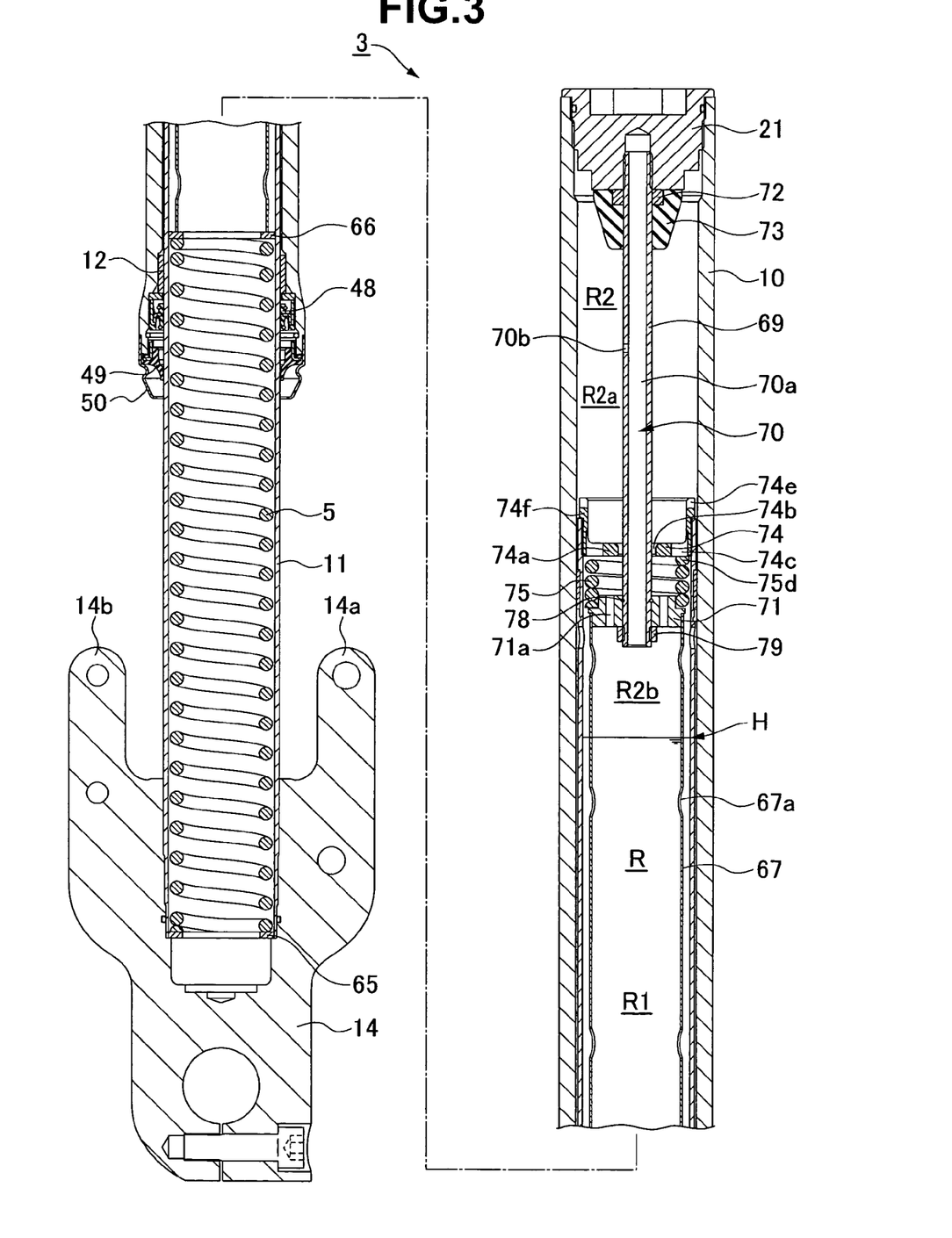
FIG. 3 is a vertical cross sectional view showing a right front fork in the inverted type front fork apparatus in FIG. 1.

An inverted type front fork apparatus 1 of a two-wheeled motor vehicle shown in FIG. 1 is structured by connecting a left front fork 2 shown in FIG. 2 and a right front fork 3 shown in FIG. 3 by upper and lower brackets (not shown). This structure is mounted to a vehicle body via a steering shaft (not shown) so as to be capable of limited rotation, supports an axle by the left front fork 2 and the right front fork 3, and absorbs an impact applied from a road surface so as to damp the impact. In this case, suspension springs 4 and 5 are installed in the left and right front forks 2 and 3 respectively. A damper apparatus 6 is installed in the left front fork 2, but the damper apparatus is not installed in the right front fork 3.

The left front fork 2 shown in FIGS. 1 and 2 is structured such that an inner tube 11 is inserted into an outer tube 10, and the suspension spring 4 and the damper apparatus 6 are installed between the outer tube 10 and the inner tube 11, as mentioned above. The outer tube 10 is supported to a vehicle body side by using upper and lower steering brackets (not shown), and an axle bracket 14 fixed to a lower end portion of the inner tube 1 is supported to a tire wheel side by using an axle. A fender stay attaching portion 14a and a brake caliper attaching portion 14b are integrally formed with the axle bracket 14 in a front side and a rear side, respectively.

A guide bush 12 with which an outer periphery of the inner tube 11 is brought into slidable contact is fitted to an inner periphery of a lower portion of the outer tube 10, and a slide bush 13 brought into slidable contact with an inner periphery of the outer tube 10 is fitted to an outer periphery of an upper portion of the inner tube 11, whereby the outer tube 10 and the inner tube 11 are slidably fitted to each other. An annular chamber 15 defined by the guide bush 12 in the inner periphery of the lower portion of the outer tube 10 and the slide bush 13 in the outer periphery of the upper portion of the inner tube 11 is formed between the outer periphery of the inner tube 11 and the inner periphery of the outer tube 10.

The damper apparatus 6 is constituted by a damper cylinder 16 arranged vertically on a bottom portion of the axle bracket 14 of the inner tube 11, and a piston rod 20 in which a piston 17 sliding within the damper cylinder 16 is attached to an end portion. An upper end portion of the piston rod 20 is fastened by screwing to a cap bolt 21 screwed to the inner periphery of the upper end portion of the outer tube 10 via a lock nut 22. An oil chamber S is formed within the damper cylinder 16.

A rod guide assembly 25 constituted by a rod guide 23 in which a guide bush is fitted and attached to an inner periphery, or the like is provided in an inner periphery of an opening portion of the damper cylinder 16. The piston rod 20 is slidably inserted into the damper cylinder 16 via an inner peripheral surface of the guide bush of the rod guide assembly 25. A piston valve mechanism 26 is provided in an end portion of the piston rod 20.

In the piston 17 of the piston valve mechanism 26, an expansion side flow path 30 and a compression side flow path 31 are formed so as to penetrate in an axial direction, and an expansion side valve 32 and a compression side valve (a check valve) 33 are placed in both end surfaces in an axial direction. An oil chamber S within the damper cylinder 16 is sectioned into an upper chamber S1 and a lower chamber S2 by the piston 17.

A support member 34 is provided in an inner periphery of the lower portion of the damper cylinder 16. The support member 34 and the damper cylinder 16 are fixed to a bottom portion of the axle bracket 14 by a center bolt 36 while pinching a bottom portion of a cup-shaped seat plate 35. A bottom piston valve mechanism 40 is provided in an outer periphery of a bolt 37 screwed to an upper portion of the support member 34.

In a bottom piston 41 of the bottom piston valve mechanism 40, a compression side flow path 42 and an expansion side flow path 43 are formed so as to penetrate in an axial direction, and a compression side valve 44 and an expansion side valve 45 (a check valve) are attached to both end surfaces in an axial direction. A base chamber S3 is defined in a lower portion of the bottom piston valve mechanism 40.

The damper cylinder 16 is arranged within the inner tube 11, and forms an oil reservoir chamber R (an oil surface H) constituted by oil chamber R1 and an air chamber R2 in an upper portion of the oil chamber R1, with respect to the inner tube 11. A connecting hole 47 is provided in a lower portion of the bush 13 in the upper portion of the inner tube 11, connects the oil reservoir chamber R with the annular chamber 15 in an outer periphery of the inner tube 11, and lubricates the guide bush 12 and an oil seal 48 in an inner periphery of the lower portion of the outer tube 10.

On the lower end of the outer tube 10, a dust seal 49 is fitted to an inner periphery of an opening portion, and a case cover 50 covering the dust seal 49 is fitted to an outer periphery.

A through hole 16a is provided in a side wall of the damper cylinder 16 at an area of the base chamber S3, whereby the oil chamber S within the damper cylinder 16 is connected with the oil reservoir chamber R via the base chamber S3.

A rebound spring 51 is pressure inserted and fitted to an inner periphery of an upper portion of the damper cylinder 16 so as to be brought into contact with a lower surface of the rod guide assembly 25.

A cylindrical oil lock collar 52 is fixed to an upper end portion of the damper cylinder 16.

An oil lock piece assembly 53 is firmly fixed to the piston rod 20. The oil lock piece assembly 53 has a holder 54 firmly fixed to an outer periphery of the piston rod 20, and an annular check valve 56 provided between a valve seat portion 54a in an outer periphery of the holder 54 and a stopper ring 55 so as to be movable upward and downward. The check valve 56 provided so as to be engaged within the oil lock collar 52 in a tight state during maximum compression.

A lower end portion of the suspension spring 4 is supported to an upper end of the oil lock collar 52. An upper end portion of the suspension spring 4 is supported to the lock nut 22 fixed to an outer periphery of a base end portion of the piston rod 20 via an upper spring collar 61 in which a holder 60 is fitted to an inner periphery of a lower end portion, and a concave seat plate 62. Movement in a radial direction of the concave seat plate 62 is limited by an outer periphery of the lock nut 22. A plurality of openings 61a connecting the inner and outer air chambers R2 are arranged in an axial direction at the upper spring collar 61.

An impact force from a road surface is absorbed by the suspension spring 4.

Next, a description will be given of an operation of the left front fork 2.

When compressing the left front fork 2, the inner tube 11 goes into the outer tube 10, the suspension spring 4 is compressed, and the impact force from the road surface is absorbed.

At this time, the piston rod 20 makes an intrusion into the oil chamber S within the damper cylinder 16. The oil within the lower chamber S2 below the piston passes through the compression side flow path 31 of the piston 17, and opens the compression side valve 33 so as to be guided within the upper chamber S1. Oil in correspondence to an intrusion volume of the piston rod 20 passes through the compression side flow path 42 of the bottom piston 41 in the bottom piston valve mechanism 40 from the lower chamber S2 so as to deflect the compression side valve 44, and is guided to the oil reservoir chamber R via the base chamber S3 and the through hole 16a. When the oil deflects the compression side valve 33 of the piston 17 and the compression side valve 44 of the bottom piston 41, a damping force in the compression side is generated.

During maximum compression of the left front fork 2, the check valve 56 of the oil lock piece assembly 53 goes into the oil lock collar 52. An upper end of the check valve 56 is brought into contact with the valve seat portion 54a of the holder 54, whereby the oil flowing through the inner periphery of the check valve 56 is shut off. Accordingly, the oil is sealed within a space 63 defined by the oil lock piece assembly 53 and the oil lock collar 52, flows to the oil reservoir chamber R through only a small gap formed between an outer peripheral surface of the check valve 56 and the oil lock collar 52, and generates an oil lock effect. As a result, it is possible to avoid a rapid collision between the upper end portion of the inner tube 11 and the cap bolt 21.

During expansion of the left front fork 2, the piston rod 20 goes out from the oil chamber S within the damper cylinder 16. The oil within the oil reservoir chamber R opens the expansion side valve 45 via the through hole 16a, the base chamber S3 and the expansion side flow path 43 of the bottom piston 41, and is guided to the lower chamber S2.

As mentioned above, during compression of the left front fork 2, the damper apparatus 6 mainly generates compression side damping force by the compression side valve 44 of the bottom piston valve mechanism 40, and secondarily generates a damping force, or hardly generates a damping force, in the compression side valve 33 of the piston valve mechanism 26.

During expansion of the left front fork 2, the damper apparatus 6 generates the expansion side damping force by the expansion side valve 32 of the piston valve mechanism 26, and hardly generates any damping force in the expansion side valve 45 of the bottom piston valve mechanism 40.

In accordance with the compression side and expansion side damping forces, the telescopic motion of the left front fork 2 is damped.

The oil lock piece assembly 53 is structured such that when the left front fork 2 changes from the maximum compression state to the expansion process, the check valve 56 of the oil lock piece 47 separates from the valve seat portion 54a of the holder 54, and allows oil to flow into the space 63 through the inner periphery of the check valve 56, thereby canceling a negative pressure within the space 63 in an early stage.

The left front fork 2 is structured as mentioned above. However, the right front fork 3 shown in FIGS. 1 and 3 is different from the left front fork 2 mainly in that the damper apparatus 6 arranged in the left front fork 2 is not provided. Accordingly, in the right front fork 3, a description of the same portions as those of the left front fork 2 is omitted by attaching the same reference numerals.

An oil reservoir chamber R constituted by an oil chamber R1 (an oil surface H) and an air chamber R2 is provided in the inner portion of the outer tube 10 and the inner tube 11 of the right front fork 3.

In the right front fork 3, the suspension spring 5 is provided along the inner periphery of the lower portion of the inner tube 11. A lower end portion of the suspension spring 5 is supported to the axle bracket 14 of the outer tube 10 via a washier 65, and an upper end portion of the suspension spring 5 is supported to a spring seat 71 fixed to a lower end portion of a hollow rod 69 via a washier 66 and a spring collar 67. An upper end of the hollow rod 69 is screwed to the cap bolt 21 so as to be fixed by a lock nut 72. The spring seat 71 is fixed to an outer periphery of the lower end portion of the hollow rod 69 by a stopper ring 78 and a nut 79. A through hole 71a of the spring seat 71 is formed in an axial direction.

A plurality of openings 67a connecting an inner side and an outer side of each of the oil chamber R1 and the air chamber R2 are arranged in an axial direction in the spring collar 67. Accordingly, the suspension spring 5 is interposed between the inner tube 11 and the outer tube 10 so as to absorb an impact from the road surface.

Figure 5A:
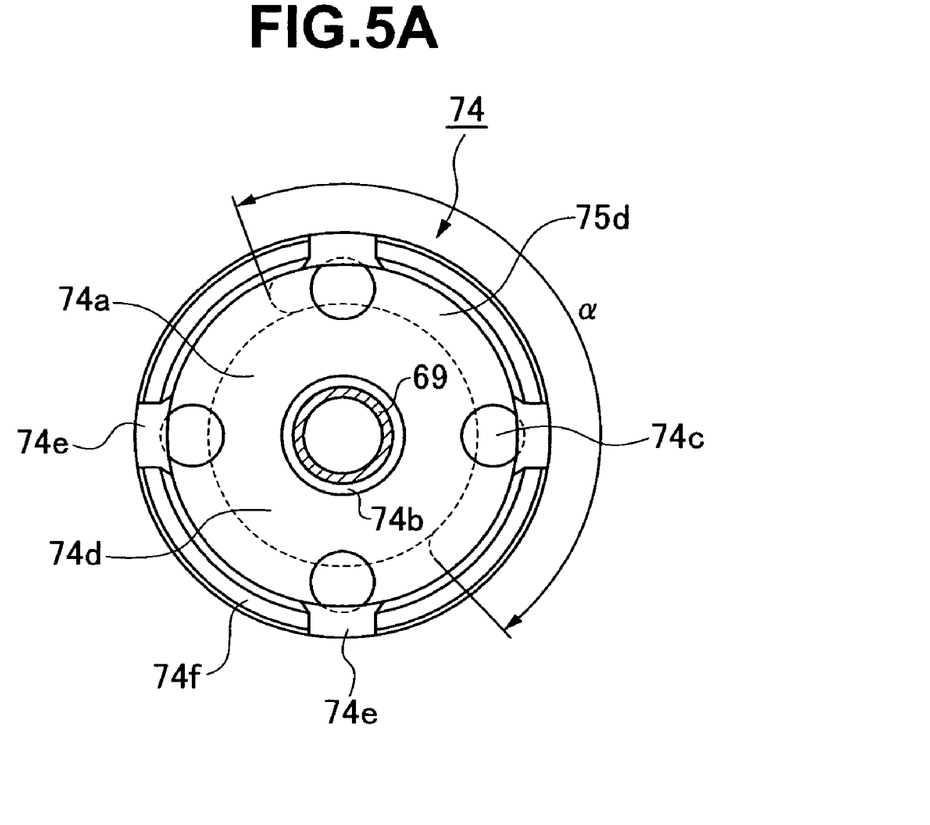
FIG. 5A is a top elevational view of the stopper plate and FIG. 5B is a cross sectional view of thereof.
Figure 5B:
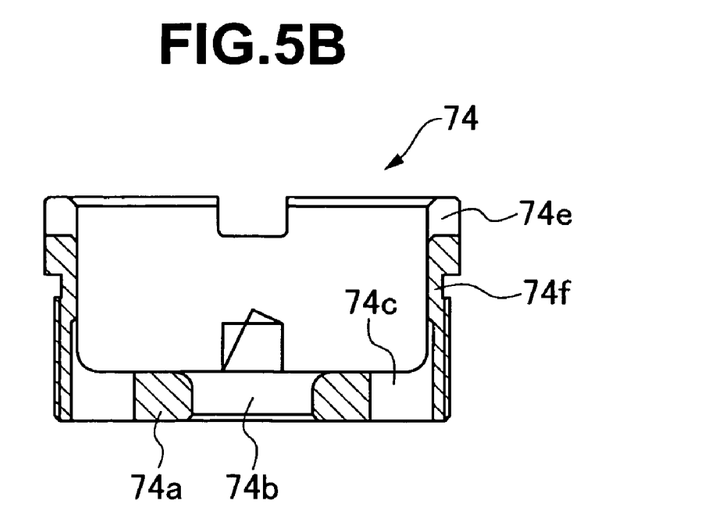

A bump rubber 73 constituted by an elastic body such as a rubber or the like is fitted to an outer periphery of an upper end portion of the hollow rod 69. A closed-end tubular stopper plate 74 having an open upper portion is attached by screwing to the inner periphery of the upper end portion of the inner tube 11 in the right front fork 3. An upper air chamber R2a and a lower air chamber R2b are sectioned in upper and lower sides of the stopper plate 74. During maximum compression, the bump rubber 73 collides with a bottom portion 74a of the stopper plate 74 so as to damp. As in detail shown in FIGS. 5A and 5B, a through hole 74b through which the hollow rod 69 passes is formed in the bottom portion 74a of the stopper plate 74. A plurality, four in the present embodiment, of connecting holes 74c are formed in an outer peripheral portion of the bottom portion 74a. An annular collision portion 74d with which the bump stopper is collided during maximum compression is formed between an outer periphery of the through hole 74b and the four connecting holes 74c. Reference symbol 74e denotes a plurality of notch portions for engaging a tool. The through hole 74b in a center portion of the stopper 74 and a plurality of connecting holes 74c in an outer peripheral portion connecting the upper air chamber R2a over the stopper plate 74 and the lower air chamber R2b below the stopper plate 74. A tubular portion 74f of the stopper plate 74 stops expansion of the bump rubber 73 and increases a bump load characteristic after a last half of a bump stroke.

A hollow hole 70a having a lower end open to the lower air chamber R2b below the stopper plate 74, and a horizontal hole 70b open to the upper air chamber R2 above the stopper plate 74, to the atmospheric air at a time of the oil filling, are formed in the hollow rod 69, whereby a flow path 70 is created connecting the upper and lower air chambers R2a and R2b locating above and below the stopper plate 74.

An upper outer periphery of the spring seat 71 is formed in a small diameter. An inner periphery of a small-diameter lower end portion of the rebound spring 75 forming the cushioning at a time of the full expansion is fitted to an outer periphery of the small-diameter portion of the spring seat 71 by a press fitting. The rebound spring 75 is formed in a tapered shape. An upper side of the rebound spring 75 is enlarged, upper and lower end surfaces thereof are mechanically ground, and a flat end coil portion 75d having about one half turn (an angle α) is formed as shown by a broken line in FIG. 5A.

Next, a description will be given of an operation of the right front fork 3.

During compression of the right front fork 3, the inner tube 11 goes into the outer tube 10, and the hollow rod 69 and the spring seat 71 fixed to the lower end portion thereof go into the inner tube 11, whereby the suspension spring 5 is compressed, and then absorbing the impact force from the road surface is absorbed. During maximum compression, the bump rubber 73 collides with the stopper plate 74 in the upper end portion of the inner tube 11 so as to facilitate cushioning during maximum compression.

During expansion of the right front fork 3, the hollow rod 69 moves out of the inner tube 11, and the suspension spring 5 is expanded. The telescopic motion of the right front fork 3 is damped by the damper apparatus 6 of the left front fork 2 via upper and lower brackets, not shown.

During maximum expansion, an upper end of the rebound spring 75 fitted to the outer periphery of the spring seat 71 collides with a lower surface of the stopper plate 74 so as to facilitate cushioning during maximum expansion.

Figure 4:
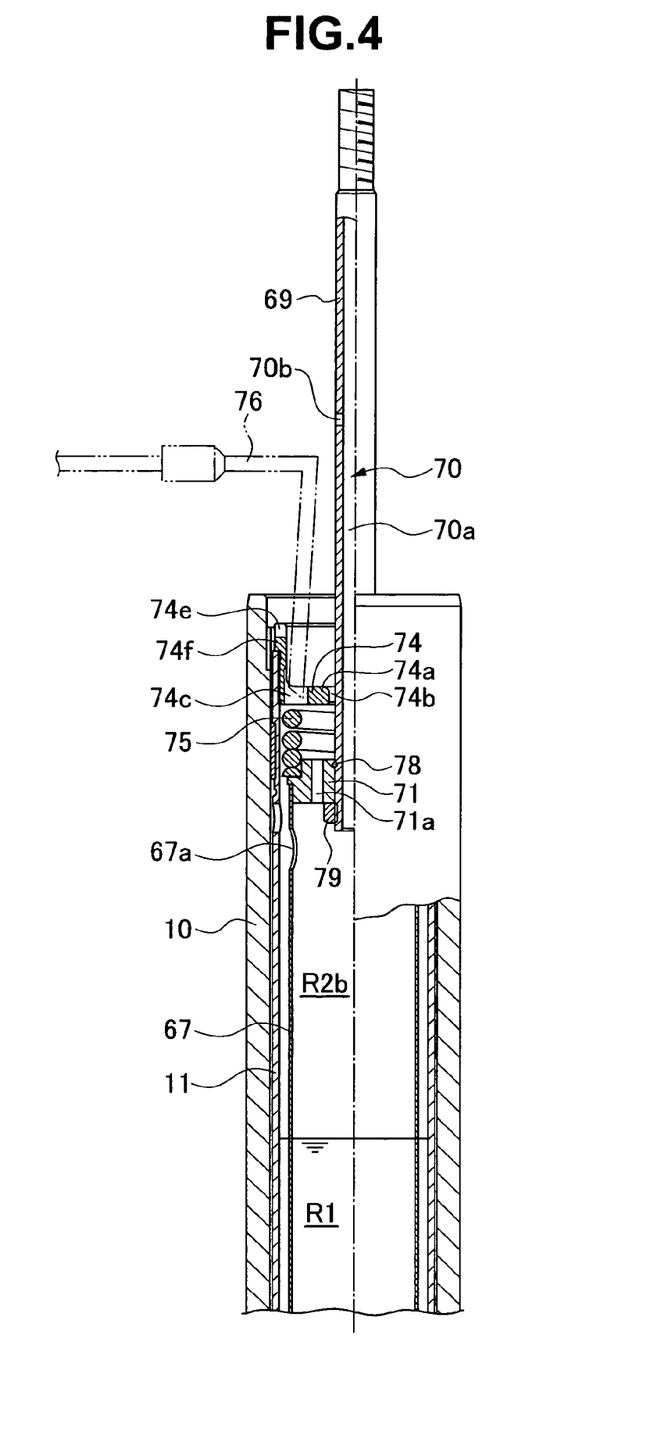
FIG. 4 is a schematic view showing an oil filling procedure for the front fork in FIG. 3.

In this case, FIG. 4 shows an oil filling procedure during assembly of the right front fork 3. The oil filling procedure may be executed in the condition that the outer tube 10 is lowered to the lowest end portion with respect to the inner tube 11, and the suspension spring 5 is in the fully expanded state. Since the suspension spring 5 is in the fully expanded state, the rebound spring 75 is compressed via the spring collar 67 on the upper end portion of the suspension spring 5 and the spring seat 71, and thus, the end coil portion 75d is brought into contact with the stopper plate 74. As a result, some of four connecting holes 74c formed in the stopper plate 74 are closed by the end coil portion 75d of the rebound spring 75. Accordingly, the oil filling work is executed by inserting an oil filling nozzle 76 to one of the connecting holes 74c which are not closed.

When the oil is filled using the oil filling nozzle 76, the air in the air chamber R2b below the stopper plate 74 moves and flows to the upper air chamber R2b (to the atmospheric air at a time of the oil filling) through the annular gap on the outer periphery of the hollow rod 69 inserted to the through hole 74b in the center portion of the stopper plate 74, and the communication hole 74c which is not closed by the end coil portion 75d of the rebound spring 75 in four connecting holes 74c in the outer peripheral portion of the stopper plate 74. In other words, the air in the lower air chamber R2b is released. In addition to the above, air is released to atmosphere through the flow path 70 comprising the hollow hole 70a and the upper horizontal hole 70b within the hollow rod 69.

In accordance with the present embodiment, the following operational advantages can be achieved.

(1) The flow path 70 connecting the upper and lower air chambers R2a and R2b locating above and below the stopper plate 74 is formed within the rod 69. The flow path 70 within the hollow rod 69 is added to a total opening area of the annular gap between the outer periphery of the rod 69 and the inner periphery of the through hole 74d in the center portion of the stopper plate 74, and the connecting hole 74c which is not closed by the end coil portion 75d of the rebound spring 75 in four connecting holes 74c in the outer peripheral portion. It is possible that the flow rate of the bleeding air from the lower air chamber R2b below the stopper plate 74 to the upper air chamber R2a (the atmospheric air at a time of the oil filling) above the stopper plate 74, is increased. It is thereby possible to increase oil filling speed. Further, there is no trouble in cleaning the working fluid in the later step due to the overflow of the oil.

(2) Since a plurality of connecting holes 67a connecting the inner side and the outer side of the spring collar 67 are arranged in the axial direction, the outer air chamber R2b of the spring collar 67 is communicated with the inner air chamber R2b, so that the air below the stopper plate 74 moves easily to the upper air chamber R2a (the atmospheric air at a time of the oil filling). It is thereby possible to increase the oil filling speed.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof Therefore, the present invention should not be understood as limited to the specific embodiment set out above, but should be understood to include all possible embodiments which can be encompassed within a scope of equivalents thereof with respect to the features set out in the appended claims.

What is claimed is:

1. An inverted type front fork in a motor vehicle comprising:
    an outer tube on a vehicle body side;
    an inner tube in a tire wheel side, being slidably inserted into the outer tube;
    suspension spring provided between the outer tube and the inner tube;
    an oil chamber provided within the outer tube and the inner tube; and
    an air chamber provided in an upper portion of the oil chamber,
    wherein a stopper plate having a through hole formed in a center portion is fitted to an inner periphery of an upper end portion of the inner tube,
    the air chamber is sectioned into upper and lower sides of the stopper plate,
    a rod attached to the outer tube is inserted into the inner tube via the through hole of the stopper plate,
    a spring seat supporting an upper end portion of the suspension spring is provided in an end portion of the rod;
    a rebound spring is interposed between the spring seat and the stopper plate,
    a plurality of connecting holes connecting the upper and lower air chambers above and below the stopper plate are formed in an outer peripheral portion of the stopper plate, and
    a flow path connecting the upper and lower air chambers is formed within the rod.

2. An inverted type front fork in a motor vehicle as claimed in claim 1, wherein a spring collar is interposed between an upper end portion of the suspension spring and the spring seat, and a plurality of connecting holes connecting inner and outer peripheries of the spring collar are arranged in an axial direction.

3. An inverted type front fork in a motor vehicle as claimed in claim 1, wherein the stopper plate is formed in a closed-end tubular shape having an open upper portion, and the stopper plate is fixed by screwing to an inner periphery of an upper end portion of the inner tube.

4. An inverted type front fork in a motor vehicle as claimed in claim 1, wherein the rebound spring is formed in a tapered shape having an enlarged upper side, an outer periphery of an upper portion of the spring seat is formed so as to have a small diameter, and an inner periphery of a small-diameter lower end portion of the rebound spring is press fitted to an outer periphery of the small-diameter portion of the spring seat.

5. An inverted type front fork in a motor vehicle as claimed in claim 4, wherein the rebound spring is structured such that an end surface is ground, and a flat coil end portion having about one half turn is formed.

* * * * *